(12) United States Patent
Rhee et al.

(10) Patent No.: US 8,055,299 B2
(45) Date of Patent: Nov. 8, 2011

(54) MOBILE INPUT DEVICE OF MOBILE TERMINAL

(75) Inventors: Do Young Rhee, Yongin-si (KR); Jeong Seok Lee, Anyang-si (KR); Seong Min Seo, Yongin-si (KR); Tae Mi Kim, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 502 days.

(21) Appl. No.: 12/267,808

(22) Filed: Nov. 10, 2008

(65) Prior Publication Data

US 2009/0149219 A1    Jun. 11, 2009

(30) Foreign Application Priority Data

Dec. 10, 2007 (KR) .......................... 10-2007-0127420

(51) Int. Cl.
*H04B 1/38* (2006.01)

(52) U.S. Cl. ..................................... 455/557; 455/550.1
(58) Field of Classification Search .................. None
See application file for complete search history.

(56) References Cited

U.S. PATENT DOCUMENTS

| | | | |
|---|---|---|---|
| 7,139,591 B2 * | 11/2006 | Callaghan et al. | 455/557 |
| 7,505,785 B2 * | 3/2009 | Callaghan et al. | 455/557 |
| 2006/0183505 A1 * | 8/2006 | Willrich | 455/566 |
| 2007/0106950 A1 * | 5/2007 | Hutchinson et al. | 715/761 |
| 2007/0233513 A1 * | 10/2007 | Lapstun et al. | 705/1 |

\* cited by examiner

*Primary Examiner* — Cassandra Cox
(74) *Attorney, Agent, or Firm* — Cha & Reiter, LLC

(57) ABSTRACT

A mobile input device of a mobile terminal includes: a selection unit for selecting an application program of the mobile terminal; an execution instruction unit for generating an instruction to execute the application program; and a wireless communication unit for transmitting the instruction to execute to the mobile terminal, wherein the mobile input device inputs information to the executed application program.

13 Claims, 5 Drawing Sheets

MOBILE INPUT DEVICE OF MOBILE TERMINAL

CLAIM OF PRIORITY

This application claims priority to an application entitled "MOBILE INPUT DEVICE OF MOBILE TERMINAL" filed in the Korean Intellectual Property Office on Dec. 10, 2007 and assigned Serial No. 2007-0127420, the contents of which are incorporated herein by reference in their entirety.

BACKGROUND OF THE INVENTION

1. Field of the Invention

The present invention relates to a mobile input device of a mobile terminal, and more particularly, to a mobile input device that can select various application programs, transmit an execution instruction of a selected application program to the mobile terminal using wireless communication, and input information to the application program executed in the mobile terminal.

2. Description of the Related Art

Currently mobile terminals, such as a mobile phone, a personal digital assistant (PDA), and a smart phone, that can provide various functions are widely used.

The provision of various functions in the mobile terminal, such as: a wireless Internet function, an electronic scheduler function, a multimedia photographing/reproducing function, and a game function, in addition to a basic communication function, has led to a demand for a variety of function-specific data input devices for input of data to the mobile terminal.

Typical conventional data input devices of the mobile terminal include, for example, a keypad, a touch pad, and a touch screen. When inputting a character, a user unskilled at using the input device may experience difficulty due to the small size of the input device, a complicated character input system, or a different input method according to a kind of a product.

At present, one method of data input includes displaying a virtual soft keypad on a touch screen and selecting the virtual soft keypad using a stylus with a touch method. In order to perform the aforementioned exemplary method, a user extracts a stylus mounted in a mobile terminal, and then uses the stylus with a touch method. The touch method includes using the stylus to manually select an application program on the mobile terminal by selecting from a menu of the mobile terminal, executing the application program after a relatively lengthy plurality of steps, and inputting information to the executed application program.

SUMMARY OF THE INVENTION

The present invention has been made in view of the above problems, and provides a mobile input device of a mobile terminal and a system that can execute an application program in the mobile terminal using wireless communication and that enables convenient application-specific input of information.

In accordance with an aspect of the present invention, a mobile input device of a mobile terminal includes: a selection unit for selecting an application program; an execution instruction unit for generating an instruction to execute the application program; and a wireless communication unit for transmitting the instruction to the mobile terminal, wherein the mobile input device inputs information to the application program.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
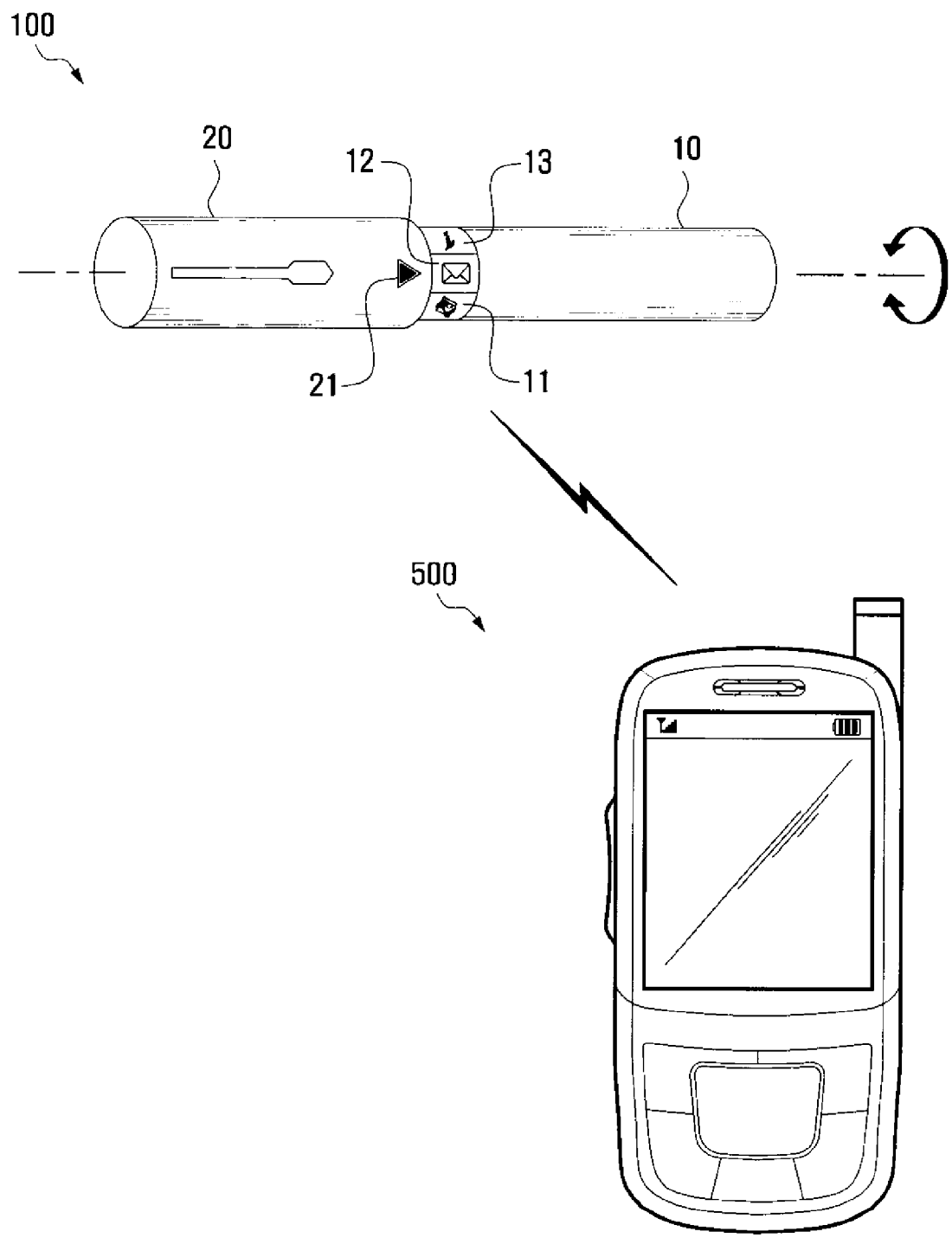
FIG. 1 is a perspective view illustrating a configuration of a mobile input device according to a first exemplary embodiment of the present invention.

Exemplary embodiments of the present invention are described with reference to the accompanying drawings in detail. The same reference numbers are used throughout the drawings to refer to the same or like parts. The views in the drawings are schematic views only, and are not intended to be to scale or correctly proportioned. Detailed descriptions of well-known functions and structures incorporated herein may be omitted for clarity and conciseness when their inclusion could obscure apprehension of the subject matter of the present invention by a person of ordinary skill in the art.

While the present invention may be embodied in many different forms, specific exemplary embodiments of the present invention are shown in drawings and are described herein in detail, with the understanding that the present disclosure is to be considered exemplary of the principles of the invention and is not intended to limit the invention to the specific exemplary embodiments illustrated.

Figure 2:
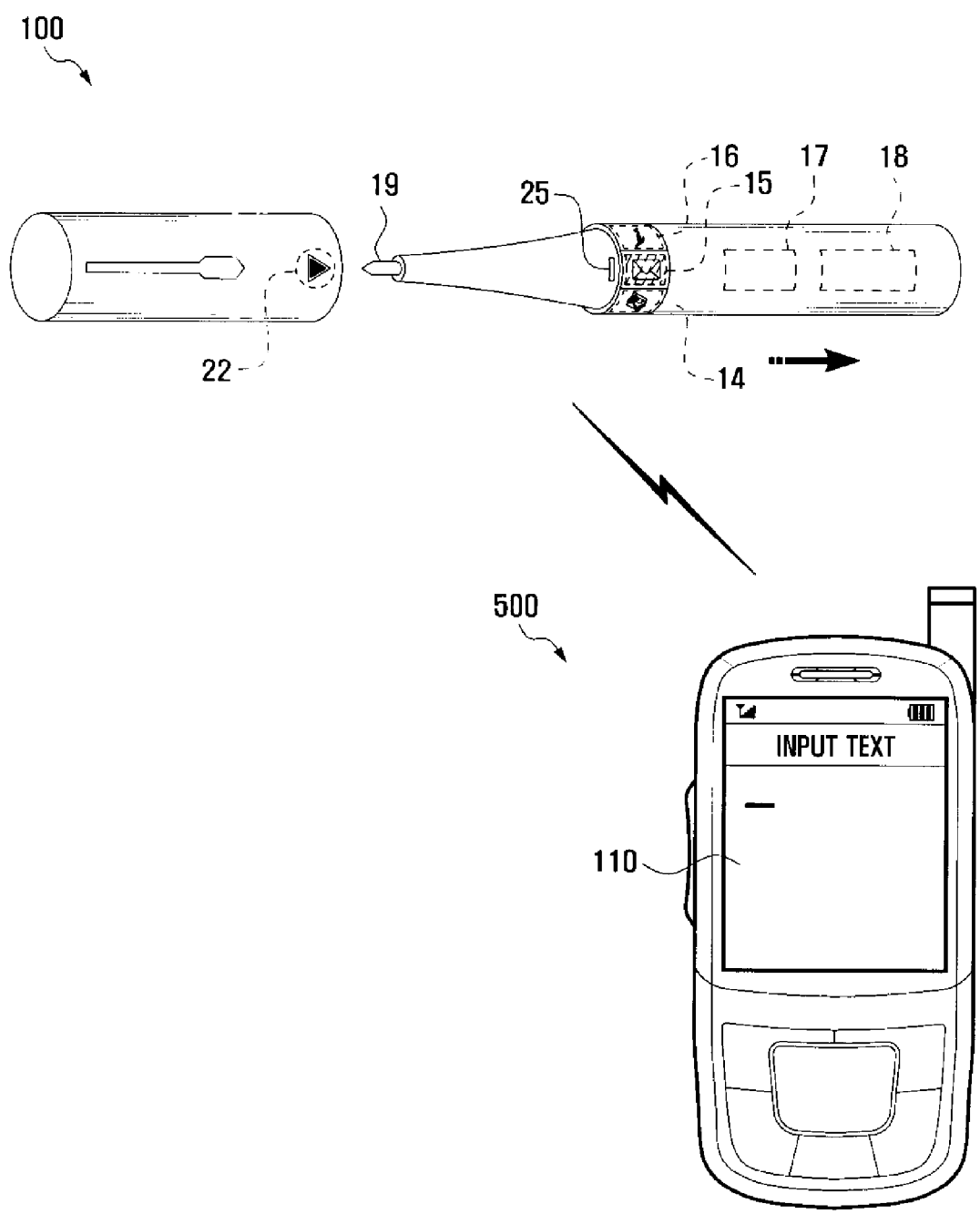
FIG. 2 is a perspective view illustrating operation of the mobile input device of FIG. 1.

FIG. 1 is a perspective view illustrating a configuration of a mobile input device 100 according to a first exemplary embodiment of the present invention. FIG. 2 is a perspective view illustrating operation of the mobile input device.

The mobile input device 100 has a basic structure of a conventional pen form and includes a pen body 10 and a pen cap 20. The pen body 10 and the pen cap 20 perform a function of a selection unit of the mobile input device 100. The mobile input device 100 of the pen form includes a wireless communication unit 18 such as Bluetooth, Ultra Wide Band (UWB), Zigbee, and WiFi at the inside thereof that performs local area wireless communication with a mobile terminal 500 through a local area network such as Bluetooth, Ultra Wide Band (UWB), Zigbee, and WiFi.

The pen cap 20 has a structure that is rotatably and detachably fastened to the pen body 10, similar to a cap of a conventional ballpoint pen. At a part of an outer surface of the pen cap 20, an indicator 21 is marked by printing. Pen cap 20 also includes a magnet 22 which can be provided in an inner area of the pen cap 20 at a position corresponding to that of the outer surface of the pen cap 20 at which the indicator 21 is marked.

A plurality of icons 11, 12, and 13 representing application programs of the mobile terminal 500 are marked on an outer surface of the pen body 10 in an area in proximity to the pen cap 20. Hall sensors 14, 15 and 16 are provided in an inner area of the pen body 10 at positions corresponding to those of the outer surface of the pen body 10 at which the icons 11, 12, and 13, respectively, are marked.

A user can select one of the icons 11, 12, and 13 marked on the pen body 10 by rotating the pen body 10 so that the indicator 21 corresponds to the selected one of the icons 11, 12, and 13. By way of example, if the user selects the intermediate icon 12 using the indicator 21, as shown in FIG. 2, the hall sensor 15 disposed to correspond to the intermediate icon 12 senses a magnetic field of the magnet 22 disposed in an area of the indicator 21. Thereby, the hall sensor 15 determines selection of the intermediate icon 12.

When a user selects an application program of the mobile terminal 500 corresponding to the intermediate icon 12 using the above-described method, if the pen cap 20 is then separated from the pen body 10, as shown in FIG. 2, a contact point switch 25 attached to the pen body 10 releases from the depressed position and protrudes from the pen body 10. An inner surface of pen cap 20 depresses the contact point switch 25 when pen body 10 is inserted. This holds the contact point switch 25 in an off state. When the contact point switch 25 is turned on, and as the pen cap 20 containing the sensed magnet 22 is removed, the hall sensor 15 no longer senses a magnetic field and is turned off. A controller 17 provided in the pen body 10 recognizes the turning off of the in hall sensor 15 as an execution instruction of an application program corresponding to the selected intermediate icon 12. That is, an operation of separating the pen cap 20 from the pen body 10 performs a function of an execution instruction unit of the mobile input device 100.

Such an instruction is wirelessly transmitted to the mobile terminal 500 through the wireless communication unit 18, and the mobile terminal 500, having received the instruction, executes the selected application program. That is, when a user selects the intermediate icon 12 by rotating the pen body 10, only a selection state of the application program corresponding to the intermediate icon 12 is input to the controller 17 of the mobile input device 100, and no operation for executing the application program is performed. When a user separates the pen cap 20 from the pen body 10, the controller 17 transmits an execution instruction of the application program to the mobile terminal 500 through the wireless communication unit 18, and the mobile terminal 500 executes the corresponding application program.

Such a series of operations are performed by the controller 17 provided in the pen body 10 and a controller of the mobile terminal 500.

In the present exemplary embodiment, the contact point switch 25 receives an elastic force which enables the protrusion of the contact point switch 25 from the pen body 10, and is turned off when pressed down by the pen cap 20. When a pressing force is removed, the contact point switch 25 is turned on as it protrudes, however such a switch configuration can be embodied with various methods commonly known in the art.

When an application program is executed in the mobile terminal 500, information is input to the executed application program with various touch methods through a touch screen 110 of the mobile terminal 500 using a pen tip 19 of the mobile input device 100. For example, the mobile input device 100 can input information to an application program executed in the mobile terminal 500 using a cursive script recognition method.

Figure 3:
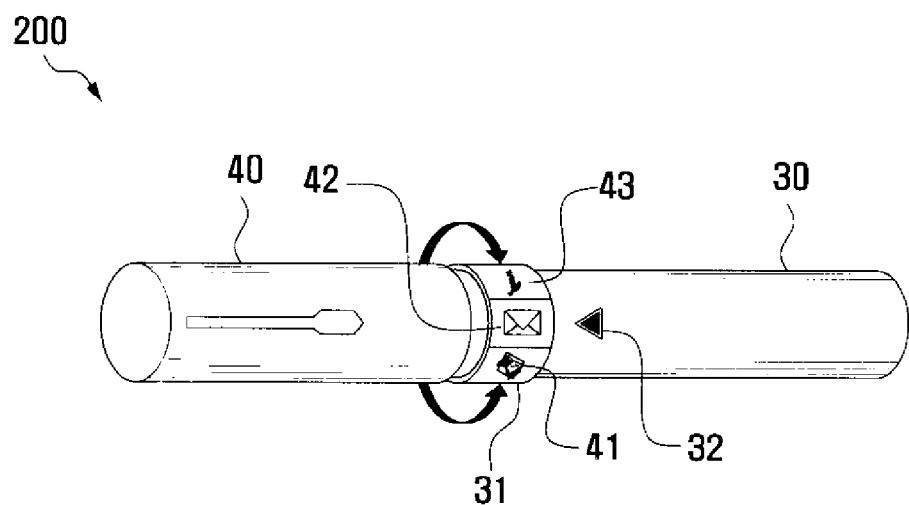
FIG. 3 is a perspective view illustrating a configuration of a mobile input device according to a second exemplary embodiment of the present invention.
Figure 4:
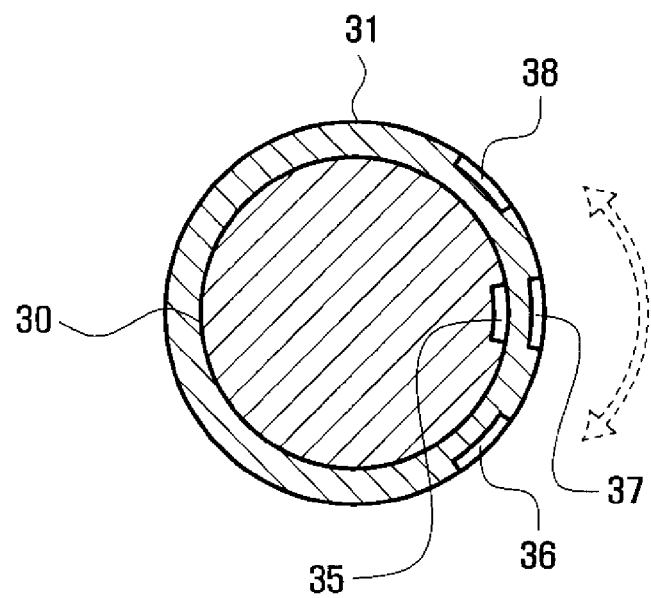
FIG. 4 is a cross-sectional view illustrating a detailed structure of the mobile input device of FIG. 3.

FIG. 3 is a perspective view illustrating a configuration of a mobile input device 200 according to a second exemplary embodiment of the present invention. FIG. 4 is a cross-sectional view illustrating a detailed structure of the mobile input device of FIG. 3.

The mobile input device 200 includes a pen body 30, a ring-shaped switch 31, and a pen cap 40. The pen body 30 and the ring-shaped switch 31 act as a selection unit of the mobile input device 200. A basic operation principle of the second exemplary embodiment is similar to that of the first exemplary embodiment, however the second exemplary embodiment includes a structure in which a user selects an application program of the mobile terminal using the ring-shaped switch 31.

The second exemplary embodiment, and third and fourth exemplary embodiments described later and illustrated in FIGS. 5 and 7, respectively, are similar to the first exemplary embodiment in a basic operation principle, however the exemplary embodiments have differences in a structure of a selection unit for selecting an application program and an execution instruction unit for executing the selected application program. The controller 17, the wireless communication unit 18, and the mobile terminal 500 may be equally applied to all of the described exemplary embodiments.

In the mobile input device 200 of the second exemplary embodiment, icons 41, 42, and 43 representing application programs of the mobile terminal 500 are marked on an outer surface of the ring-shaped switch 31. Hall sensors 36, 37, and 38 are provided in an inner area of the ring-shaped switch 31 at positions corresponding to those of the outer surface of the ring-shaped switch 31 at which the icons 41, 42, and 43, respectively, are marked.

An indicator 32 is marked on the outer surface of the pen body 30, and a magnet 35 is provided in the pen body 30 at a position corresponding to that of the outer surface of the pen body 30 at which the indicator 32 is marked, as shown in FIG. 4. Application programs corresponding to the icons 41, 42, and 43 can be selected by rotating the ring-shaped switch 31. An operation of executing the application program can be executed by an operation of separating the pen cap 40 from the pen body 30 with the same principle as that of the first exemplary embodiment. That is, an operation of separating the pen cap 40 from the pen body 30 performs a function of instructing an execution of the selected application program to the controller 17 of the mobile input device 200.

Figure 5:
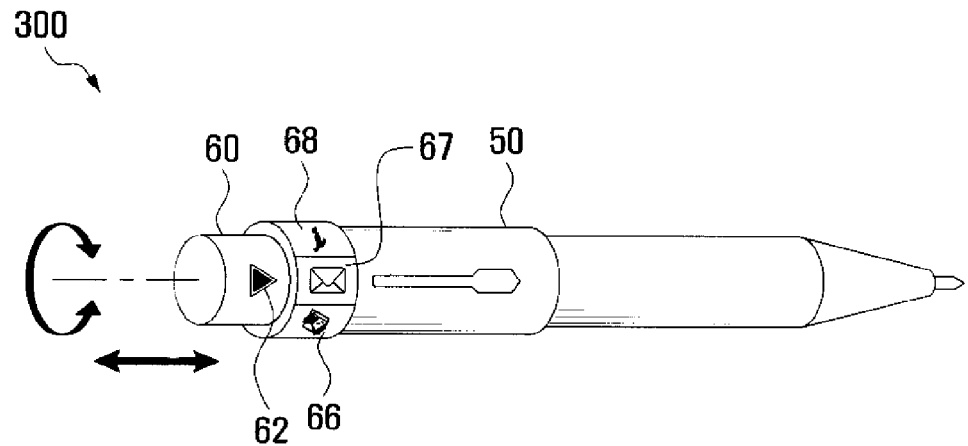
FIG. 5 is a perspective view illustrating a configuration of a mobile input device according to a third exemplary embodiment of the present invention.
Figure 6A:
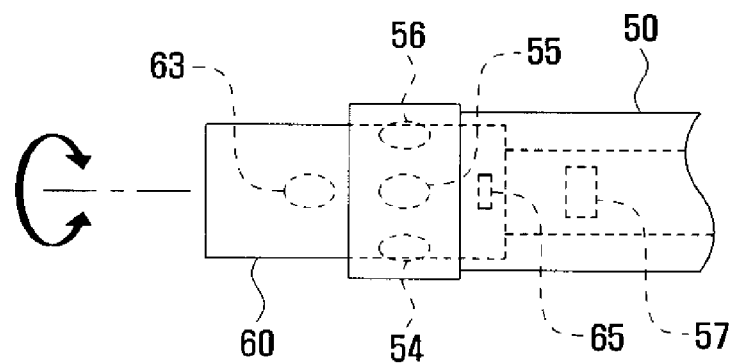
FIGS. 6A and 6B are plan views illustrating a detailed structure of the mobile input device of FIG. 5.
Figure 6B:
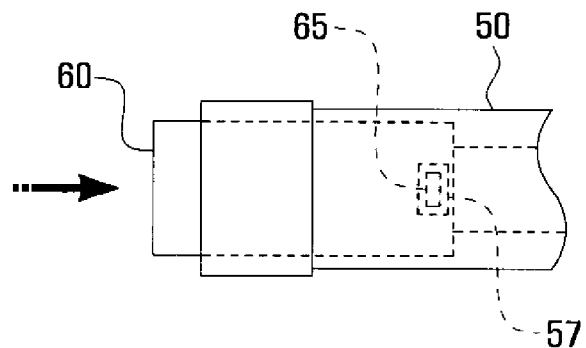

FIG. 5 is a perspective view illustrating a configuration of a mobile input device 300 according to a third exemplary embodiment of the present invention. FIGS. 6A and 6B are plan views illustrating a detailed structure of the mobile input device of FIG. 5

The mobile input device 300 includes a pen body 50 and a button 60 that can be rotated and pushed. Icons 66, 67, and 68 representing application programs are marked on an outer surface of the pen body 50 adjacent to the button 60, and an indicator 62 is marked on a surface of the button 60. Further, as shown in FIG. 6B, a magnet 63 is provided in the button 60 at a position corresponding to that of the surface of the button 60 at which the indicator 62 is marked, and a first contact point 65 is provided in the button 60 adjacent to the magnet 63. A portion of the pen body 50 adjacent to the button 60 includes hall sensors 54, 55, and 56 to correspond to the icons 66, 67, and 68, respectively, and a second contact point 57 is provided.

By rotating the button 60, a user selects one of the icons 66, 67, and 68 using the indicator 62. When the user selects one of the icons 66, 67, and 68, if the button 60 is pressed down, controller 17 transmits an instruction for executing an application program corresponding to the selected one of the icons 66, 67, and 68 to the mobile terminal 500 through the wireless communication unit 18. Thereby, the mobile terminal 500 executes the corresponding application program. That is, an operation of pressing the button 60 performs a function of instructing an execution of the selected application program to the controller 17 of the mobile input device 300.

FIGS. 6A and 6B illustrate a part of the pen body 50, the button 60, the hall sensors 54, 55, and 56, the magnet 63, and the first and second contact points 65 and 57.

A process of pressing the button 60 is described with reference to FIGS. 6A and 6B.

FIG. 6A illustrates a state of selecting one of the icons 66, 67, and 68 by rotating the button 60 when the button 60 is not pressed down. FIG. 6B illustrates a state of executing the selected application program when the first contact point 65 and the second contact point 57 are electrically connected by pressing the button 60. The first and second contact points 65 and 57 can be replaced with a switch of various forms known in the art.

Figure 7:
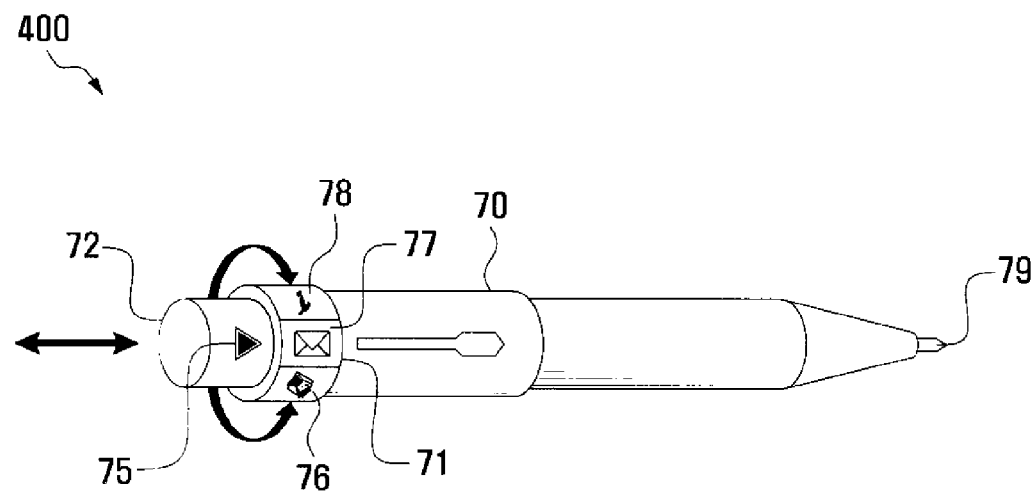
FIG. 7 is a perspective view illustrating a configuration of a mobile input device according to a fourth exemplary embodiment of the present invention.

FIG. 7 is a perspective view illustrating a configuration of a mobile input device 400 according to a fourth exemplary embodiment of the present invention.

A button 72 according to the present exemplary embodiment has a structure that can perform only a pressing operation, not a rotation operation.

As in the second exemplary embodiment, the mobile input device 400 according to the fourth exemplary embodiment has a ring-shaped switch 71, and the ring-shaped switch 71 operates as a selection unit for selecting an application program of the mobile terminal 500 by rotating.

Icons 76, 77, and 78 representing application programs of the mobile terminal 500 are marked on an outer surface of the ring-shaped switch 71. The ring-shaped switch 71 includes hall sensors (not shown) at positions corresponding to those of the outer surface of the ring-shaped switch 71 at which the icons 76, 77, and 78, respectively, are marked.

An indicator 75 is marked on an outer surface of the button 72, and a button 72 includes a magnet (not shown) at a position corresponding to that of the outer surface at which the indicator 75 is marked, and thus application programs of the mobile terminal 500 corresponding to the icons 76, 77, and 78 can be selected by rotating the ring-shaped switch 71.

In a state where a user selects the application program, wireless communication unit 18 transmits an application program execution instruction to the mobile terminal 500 when the user presses the button 72. The mobile terminal 500, having received the application program execution instruction, executes the selected application program. That is, an operation of pressing the button 72 performs a function of instructing execution of the selected application program to the controller 17 of the mobile input device 400. Thereafter, the user inputs information to the executed application program with a touch method using a pen tip 79 of the mobile input device 400, or inputs information with a cursive script recognition method by directly writing a character using the pen tip 79.

In the first to fourth exemplary embodiments, icons for representing application programs can be provided in the mobile input device 400 with various methods known in the art.

When the number of application programs in which information input of a user is necessary is relatively few, as in the above-described exemplary embodiment, icons for representing approximately three frequently used application programs may be marked with a method such as printing, however due to a trend of an increasing variety of functions, icons may require to be changed and marked, identified, or manipulated by user selection.

Figure 8:
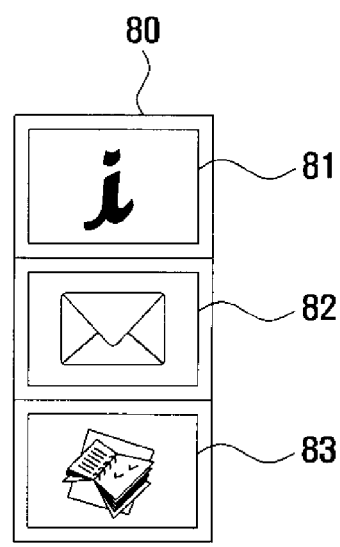
FIG. 8 is a diagram illustrating a display unit of an icon display device according to another exemplary embodiment of the present invention.

FIG. 8 is a diagram illustrating a display unit of an icon display device according to another exemplary embodiment of the present invention.

Referring to FIG. 8, icons 81, 82, and 83 can be displayed in a display unit 80 that can be formed with a liquid crystal display (LCD). A pen body contains the display unit 80 at a position where icons of a pen body, a ring-shaped switch, etc. described in the exemplary embodiments, would otherwise be located. A user can selectively display icons 81, 82, and 83. The user can change an icon of the mobile input device 400 using wireless communication of the mobile terminal 500, as needed. The display unit 80 can use various display devices such as an LCD, a flexible LCD, or an organic light-emitting diode (OLED). Due to a flexible property, the flexible LCD can be easily installed on a round surface of the pen body. Any display unit commonly known to one of ordinary skill in the art can be used. Therefore, the user can register an icon for representing a frequently used application program to the mobile input device 400 and conveniently use the icon.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A mobile input device of a mobile terminal, comprising:
   a selection unit for selecting a particular application program of the mobile terminal including a body and a switch movably fastened to an exterior of the body in which said selection unit selects the particular application program of the mobile terminal in accordance with positioning of the switch at predetermined position identified as being associated with the particular application;
   an execution instruction unit for generating an instruction to execute the selected application program of the mobile terminal; and
   a wireless communication unit for transmitting said instruction to execute to the mobile terminal,
   wherein the mobile input device inputs information to the application program.

2. The mobile input device of claim 1, wherein the mobile input device is a pen type input device.

3. The mobile input device of claim 1, further comprising a display unit for displaying icons representing at least one application program of the mobile terminal.

4. The mobile input device of claim 1, wherein the mobile input device inputs information to the application program using a touch method.

5. The mobile input device of claim 1, wherein the mobile input device inputs information to the application program using a cursive script recognition method.

6. The mobile input device of claim 1, wherein the selection unit selects the application program of the mobile terminal by rotating.

7. The mobile input device of claim 1, wherein the selection unit comprises a pen body and a pen cap rotatably fastened to the pen body and said selection unit selects the application program of the mobile terminal by rotating the pen cap.

8. The mobile input device of claim 1, wherein the execution instruction unit comprises a button, and after selection of an application program of the mobile terminal by the selection unit, the execution instruction unit generates an instruction upon pressing the button.

9. A mobile input device of a mobile terminal, comprising:
a selection unit for selecting an application program of the mobile terminal;
an execution instruction unit for generating an instruction to execute the selected application program of the mobile terminal; and
a wireless communication unit for transmitting said instruction to execute to the mobile terminal,
wherein the mobile input device inputs information to the application program, and
wherein the selection unit comprises a pen body and a ring type switch rotatably fastened to the pen body and said selection unit selects the application program of the mobile terminal by rotating the ring type switch.

10. A mobile input device of a mobile terminal, comprising:
a selection unit for selecting an application program of the mobile terminal;
an execution instruction unit for generating an instruction to execute the selected application program of the mobile terminal; and
a wireless communication unit for transmitting said instruction to execute to the mobile terminal,
wherein the mobile input device inputs information to the application program, and
wherein the execution instruction unit comprises a pen body and a pen cap detachably fastened to the pen body, wherein the execution instruction unit generates an instruction upon detaching the pen cap from the pen body.

11. A mobile input device of a mobile terminal, comprising:
a selection unit for selecting an application program of the mobile terminal;
an execution instruction unit for generating an instruction to execute the selected application program of the mobile terminal; and
a wireless communication unit for transmitting said instruction to execute to the mobile terminal,
wherein the mobile input device inputs information to the application program, wherein the selection unit comprises a pen body and a button rotatably and pushably fastened to the pen body and the selection unit selects an application program of the mobile terminal by rotating the button, and
the execution instruction unit instructs execution of the selected application program by pressing the button.

12. A mobile input device of a mobile terminal, comprising:
a selection unit for selecting an application program of the mobile terminal;
an execution instruction unit for generating an instruction to execute the selected application program of the mobile terminal; and
a wireless communication unit for transmitting said instruction to execute to the mobile terminal,
wherein the mobile input device inputs information to the application program, wherein the selection unit comprises a pen body on which icons of application programs appear and a pen cap on which an indicator is marked rotatably and detachably fastened to the pen body and selects one of the application programs by rotating the pen cap to align the indicator with the corresponding icon, and the execution instruction unit generates the instruction to execute the selected application program upon detaching the pen cap from the pen body.

13. A system for selecting an application on a mobile device, comprising:
a mobile input device comprising:
a selection unit for selecting a particular application program of the mobile terminal including a body and a switch rotatably fastened to the body in which said selection unit selects the particular application program of the mobile terminal based on a predetermined position of the switch identified as being associated with the particular application;
an execution instruction unit for generating an instruction to execute the selected application program of the mobile terminal; and
a wireless communication unit for transmitting said instruction to execute to the mobile terminal, and
a mobile terminal comprising a receiver configured to receive the transmission and input information to the selected application program.

* * * * *